US008971211B2

(12) United States Patent
Rinne et al.

(10) Patent No.: US 8,971,211 B2
(45) Date of Patent: Mar. 3, 2015

(54) ENCAPSULATION OF HIGHER-LAYER CONTROL MESSAGES FOR LOCAL AREA NETWORK SUPPORT INTO A WIDE AREA NETWORK PROTOCOL

(75) Inventors: Mika Rinne, Espoo (FI); Klaus Doppler, Espoo (FI)

(73) Assignee: Nokia Corporation, Espoo (FI)

( * ) Notice: Subject to any disclaimer, the term of this patent is extended or adjusted under 35 U.S.C. 154(b) by 23 days.

(21) Appl. No.: 13/378,361

(22) PCT Filed: Jul. 16, 2009

(86) PCT No.: PCT/IB2009/006241
§ 371 (c)(1),
(2), (4) Date: Dec. 14, 2011

(87) PCT Pub. No.: WO2011/007187
PCT Pub. Date: Jan. 20, 2011

(65) Prior Publication Data
US 2012/0087279 A1  Apr. 12, 2012

(51) Int. Cl.
*H04L 12/715* (2013.01)
*H04L 12/721* (2013.01)
(Continued)

(52) U.S. Cl.
CPC ......... *H04W 48/18* (2013.01); *H04L 12/2425* (2013.01); *H04W 48/16* (2013.01); *H04W 84/18* (2013.01); *H04W 92/02* (2013.01)
USPC ........................................................ 370/254

(58) Field of Classification Search
CPC .............. H04L 12/4645; H04L 12/467; H04L 12/5602; H04L 49/351; H04L 49/354; H04L 67/2823; H04L 12/24; H04L 12/6418; H04L 2012/6486; H04L 41/00; H04L 45/02; H04L 45/18; H04L 45/48; H04L 45/6604

USPC .......................... 370/254–340; 709/201–213
See application file for complete search history.

(56) References Cited

U.S. PATENT DOCUMENTS

| 6,628,617 | B1 * | 9/2003 | Karol et al. ................... 370/237 |
| 8,751,248 | B2 * | 6/2014 | Muraca ............................ 705/2 |

(Continued)

FOREIGN PATENT DOCUMENTS

| CN | 1925341 A | 3/2007 |
| CN | 101199161 A | 6/2008 |

(Continued)

OTHER PUBLICATIONS

3rd Generation Partnership Project, Technical Specification Group Core Network and Terminals; Access to the 3GPP Evolved Packet Core (EPC) via non-3GPP Access Networks: Stage 3 (Release 8); 3GPP Standard; 3GPP TS 24.302 v8.2.0, Jun. 1, 2009.

(Continued)

*Primary Examiner* — Ayaz Sheikh
*Assistant Examiner* — Debebe Asefa
(74) *Attorney, Agent, or Firm* — Mintz Levin Cohn Ferris Glovsky and Popeo, P.C.

(57) ABSTRACT

Methods and apparatus, including computer program products, are provided for integration of a wireless local area network and a wide area cellular network. In one aspect there is provided a method. The method may include the support node receiving, from a first node, a message including a request for information representative of a configuration of a wireless local area network accessible by the first node. The method may also include providing, in response to the received message, the information representative of the configuration of the wireless local area network. Related apparatus, systems, methods, and articles are also described.

21 Claims, 5 Drawing Sheets

(51) Int. Cl.
*H04L 12/46* (2006.01)
*H04L 12/64* (2006.01)
*H04L 29/08* (2006.01)
*H04W 48/18* (2009.01)
*H04L 12/24* (2006.01)
*H04W 48/16* (2009.01)
*H04W 84/18* (2009.01)
*H04W 92/02* (2009.01)

(56) References Cited

U.S. PATENT DOCUMENTS

| | | | |
|---|---|---|---|
| 2003/0092395 A1* | 5/2003 | Gassho et al. | 455/68 |
| 2004/0185777 A1* | 9/2004 | Bryson | 455/41.1 |
| 2006/0215601 A1* | 9/2006 | Vleugels et al. | 370/328 |
| 2007/0025306 A1 | 2/2007 | Cox et al. | |

FOREIGN PATENT DOCUMENTS

| | | | |
|---|---|---|---|
| DE | 102006040313 B3 | | 2/2008 |
| DE | 102006040313 B3 | | 2/2008 |
| EP | 1763266 | * | 3/2007 |
| EP | 1763266 A1 | | 3/2007 |

OTHER PUBLICATIONS

3rd Generation Partnership Project; Technical Specification Group Services and System Aspects; Architecture enhancements for non-3GPP Accesses (Release 8), 3GPP Standard; 3GPP TS 23.402; v8.3.0, Sep. 1, 2008.

International Preliminary Report on Patentability, received in corresponding Patent Cooperation Treaty Application No. PCT/IB2009/006241, dated Jan. 26, 2012, 7 pages.

"3rd Generation Partnership Project; Technical Specification Group Core Network and Terminals; Access to the 3GPP Evolved Packet Core (EPC) via non-3GPP Access Networks: Stage 3; (Release 8)" 3GPP Standard; 3GPP TS 24.302; 3rd Generation Partnership Project (3GPP), Mobile Competence Centre; 650 Route Des Lucioles; F-06921 Sophia-Antipolos Cedex; France; No. V8.2.0, Jun. 1, 2009, pp. 1-45, XP050365621.

"3rd Generation Partnership Project; Technical Specification Group Services and System Aspects; Architecture enhancements for non-3GPP Accesses (Release 8)" 3GPP Standard; 3GPP TS 23.402; 3rd Generation Partnership Project (3GPP), Mobile Competence Centre; 650 Route Des Lucioles; F-06921 Sophia-Antipolos Cedex; France; No. V8.3.0, Sep. 1, 2008, pp. 1-190, XP050363658.

* cited by examiner

ENCAPSULATION OF HIGHER-LAYER CONTROL MESSAGES FOR LOCAL AREA NETWORK SUPPORT INTO A WIDE AREA NETWORK PROTOCOL

RELATED APPLICATION

This application was originally filed as PCT Application No. PCT/IB2009/006241 filed Jul. 16, 2009.

FIELD

The subject matter described herein relates to wireless communications.

BACKGROUND

Wireless devices typically include connectivity to wireless local area networks via, for example, WiFi or Bluetooth access technologies. Mobile devices may also include connectivity to wireless wide area cellular networks via radio access network technologies, such as GERAN (GSM EDGE Radio Access Network), cdma 1xDO, UTRAN (UMTS Terrestrial Radio Access Network), E-UTRAN (Evolved-UTRAN), and the like. Even if the mobile device includes many of these technologies, it is not easy for a user of the mobile device to decide which access technology to use, which access type to use and how to configure the device for the selection of a network type for any given access. Typically, the choice of a local access point (or the wide area network) is completely decoupled from the service that the user actually wants to use. This has the consequence that the user may be confused with regard to problems with connectivity and service availability. Indeed, the user is often unaware of which network(s) have been selected (or should have selected) to use and what the consequences of these selections are to services and costs.

SUMMARY

In one aspect there is provided a method. The method may include the support node receiving, from a first node, a message including a request for information representative of a configuration of a wireless local area network accessible by the first node. The method may also include providing, in response to the received message, the information representative of the configuration of the wireless local area network.

In one aspect there is provided a method. The method may include generating, at a protocol engine at a first node configured to operate in a wireless local area network, a message including a request for information representative of a configuration of the wireless local area network. The method may also include transmitting the message to a second node of a cellular network.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
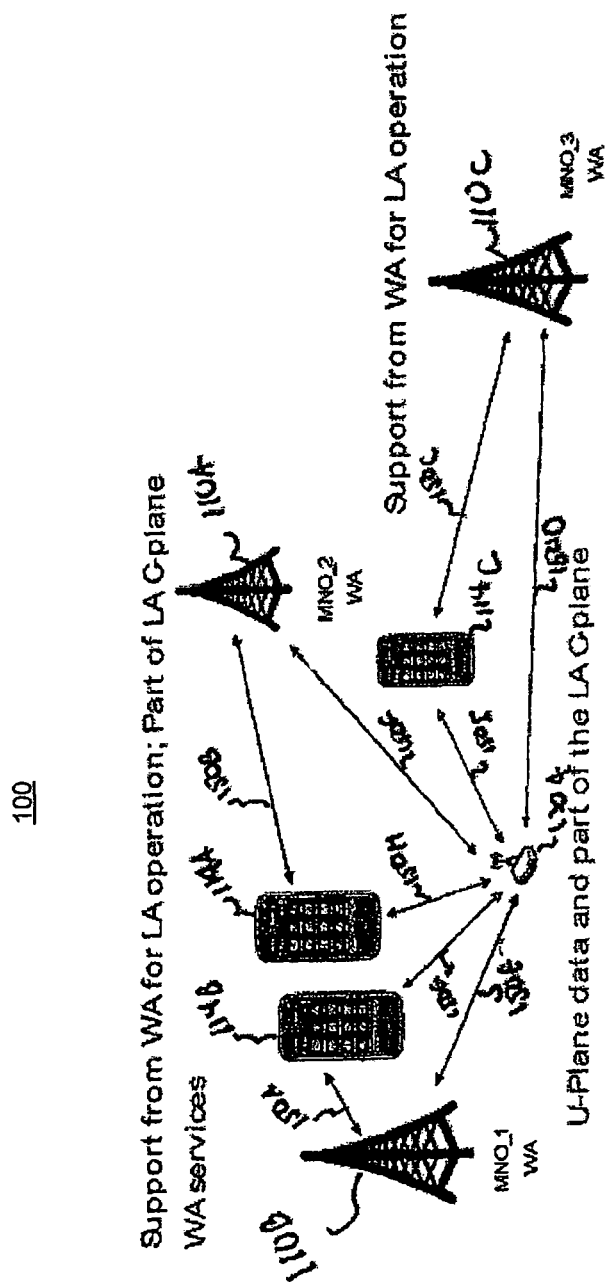
FIG. 1 depicts an example of a system 100 including wireless local area network access and wide area cellular network access.

Like labels are used to refer to same or similar items in the drawings.

DETAILED DESCRIPTION

The subject matter disclosed herein may be configured to provide connectivity to a wireless local area network, a wide area cellular network, or a combination of both. The user equipment, such as a mobile device, may wirelessly access a local area network by connecting to an Internet Protocol (IP) point of attachment (e.g., a node of the local area network, such as the default gateway or a router), and access the wide area cellular network by connecting to an IP point of attachment (e.g., a packet data network (PDN) gateway) via, for example, a base station of the wide area cellular network. The service may thus be selected for the user equipment via the local area network (also referred to as the local domain) when available, and via the wide area cellular network (also referred to as the wide area domain), when, for example, preferred by the operator (e.g., the provider of the wide area cellular network and/or local area network), service type, service source, application, whenever the local domain is not available, or as well for other reasons. This kind of smart connectivity to the local domain, the wide area domain, or a combination of both may allow the user equipment (and thus the user of the user equipment) to avoid having to make a selection between the local and wide area domains. Moreover, the user may not have to configure the user equipment for the local and wide area domains. Hence, changing from one serving domain to another domain reduces the burden on the user (e.g., a service request (e.g., an http request) may be triggered so that an application and user equipment middleware select which domain provides access to the user equipment). This so-called "smart" connectivity is feasible when compatible system designs are applied to both the local area domain and the wide area domain. The phrase "compatible designs" refers to simultaneous (e.g., non-switched) use of different systems rather than radio technology referred to as multiradio, which uses different radio technologies switched in time due to their mutual interference, although the subject matter described herein may be used in compatible design implementations as well as multiradio implementations.

To support the operation of the user equipment so that it can operate in the local domain, wide area domain, or a combination of both, the subject matter described herein introduces a support node (SN). The support node may be implemented as a node in the local area domain, in the wide area domain, in an intranet, the Internet, or a combination of thereof. Moreover, the functionality of the support node may be implemented as a stand-alone node or integrated into other nodes of the local area network and/or wide area cellular network. Moreover, the support node function may be distributed among a plurality of nodes (or locations) in the local area network, wide area cellular network, the Internet, and/or an intranet. The distributed support nodes may form a flat architecture of serving functions or the support nodes may form a hierarchy, where the closest support node requests further information (e.g., a consult) from other support nodes (e.g., when the support node lacks some support information or otherwise needs an update). The support nodes may also be operated by, for example, a consortium of device manufacturers or provided as a service offering by a wireless service provider.

In some implementations, the support node controls and/or assists the user equipment when operating in the local area network, as described further below. For example, the support node may provide information to the user equipment and/or a local access point to which the user equipment may couple (e.g., detect and connect). The information may include information to configure the user equipment access to the local access point and/or configure the user equipment. The information may also include a command to configure the user equipment and the local access point. Moreover, the information may be provided by the support node in response to a request from the user equipment and/or the local access node, or the information may be provided by the support node sua sponte. Moreover, in some implementations, the request from the user equipment and/or the local access point to the support node may be encapsulated in the control plane or the user plane of the wide area cellular network, as described further below.

Although the support node may be implemented in a node of the local and/or wide area domains, aspects of the support node may be implemented as script in a web page that can be accessed by the user equipment. The web pages may located anywhere and in multiple locations (e.g., located at a node of a wide area cellular network provided by a wireless service provider, located at a publicly available web site as so-called "support pages," and/or located in protected corporate intranet e.g. in the information management portal).

The support node may additionally configure an access point (AP, which is also referred to as a local access point (LAP)) or wireless LAN segments directly via the fixed network interfaces or indirectly via the user equipment connected to the local access points of the wireless local area network. The connectivity of the user equipment to the support node may be implemented as an IP connection, non-access stratum (NAS) signaling connection, or a circuit-switched teleservice connection via the wide area cellular network. For example, the connectivity of the local access points to the support node may be implemented as an IP/Ethernet connection. Moreover, the IP connection may be wireless, wired, or a combination of both. The user equipment in the local area network can be assisted by the support node, which can be accessed as described above. The user equipment may receive, as noted above, information from the support node. The information may include one or more of the following: operational parameters of the local area network to which the user equipment is (or will be) connected; currently used frequency band of the local area network and the local access point(s) of the local area network; the state of the local access point(s) (e.g. is the local access point in stand-by mode, an active mode, etc.); timing information (e.g., frame timing) of the local area network and/or the local access point; and the like.

The user equipment may request information, which may prompt an action from the support node. For example, the user equipment may request information about its wide area mobility or security context. Moreover, the user equipment may, for example, send a request to wake-up a given local area network or its local access point in order to allow a faster discovery and association. Further, the user equipment may deliver information about itself to the support node. For example, the user equipment may announce its presence in a local area network, its location in coordinates, its session initiation protocol (SIP) name for peer networking, or provide names of the ad hoc networks detected by the user equipment. In some implementations, this kind of information may be used by other user equipment in the same region (e.g., other user equipment(s) within the local domain, etc.) for faster and easier peer-to-peer detection and peer-to-peer messaging needs, and may be used by user equipment to detect and to join ad hoc networks.

As used herein, the local area network is also referred to as an "Optimized Local Area" (OLA), in which the local area is optimized in the sense that the local area network provides a high-performance extension to the wide area cellular network, e.g., extending the wide area cellular network into small local area domains (or cells). In some implementations, the high-performance of the wireless local area network will result from scaling operations to a short distance, from locally-available wider system bandwidth, and from flexible use of local spectrum resources. Even spectrum cognition principles for acquisition of the local and temporal spectral resources (known as "white spaces") may be utilized. The phrase "white spaces" refers to unused frequencies in a given location on an otherwise allocated frequency band, and these white space frequencies may be otherwise available for use (e.g., for short range communications.)

In some implementations, the subject matter described herein may provide a mechanism for the user equipment to communicate with support node(s) via the wide area cellular network, and vice versa. This mechanism is realized, in part, by encapsulating messages (e.g., requests) from the user equipment to the support node concerning the local domain operations into the wide area cellular messaging structures. These messaging structures include user plane or the control plane transport of the wide area network. Moreover, by similar means the messages (e.g., responses) from the support node to the user equipment and/or to the local access point may also be encapsulated into the wide area cellular messaging structures.

FIG. 1 depicts a system 100 including a local area network and a wide area cellular network. A user may utilize services and applications from a network, such as the Internet, intranet, and the like, via user equipment, such as a mobile device. The user equipments 114A-C may have connectivity to the local area network via a wireless radio connection with the local access points, such as local access point 130A. The user equipments 114A-C may also have connectivity to a wide area cellular network via a wireless radio connection to a base station, such as one or more of the base stations 110A-C. Wireless links 150A-I may provide wireless connectivity within system 100. Moreover, wireless links 150A-C may be associated with the wide area cellular network as those links couple to a base station, and wireless links 150G-I may be associated with the local area network as those links couple to the local access pointy 130A. In some implementations, wireless links 150 D-F are optional, and they couple the local access point 130A to a base station of the wide area cellular network.

In some implementations, the local area network may be implemented as an ad-hoc network (e.g., a WiFi, a Bluetooth, a device-to-device link, etc.), while the wide area cellular network may be configured as a cellular system (e.g., 3GPP GSM/EDGE, GPRS, cdma 1xDO, Wideband CDMA, HSPA, LTE, WiMax, flash OFDM, and the like). Unlike the wide area, the local area network may be configured to use a portion of the spectrum that is exempt from licensing required in many jurisdictions and regulations, or the local area network may use so-called "white spaces." The unlicensed spectrum and the "white spaces," offer additional local bandwidth and capacity that may be used to complement and augment the performance metrics of the access.

As such, the user equipment (e.g., middleware in the user equipment as bearer manager or connectivity manager and the like software) may determine whether wireless communications utilizes the unlicensed (or white space) band or licensed band (e.g., of the wide area cellular network), whether to access a local area network via the local access point, whether to access a wide area cellular network via a base station, or whether to simultaneously use a combination of both the local area and the wide area cellular networks.

The system 100 may be configured so that selected services, such as voice or emergency calls, are provided via the wide area cellular network connection. As such, the user equipment 114A making an emergency call would typically use its network connection via base station 110A for this purpose rather than the network connection via local access point 130A. The user equipments may each include radio technology that allows simultaneous use of radio circuitry to access and communicate with the local area network via a local access point 130A and the wide area cellular network via a base station without any mutual restrictions due to, for example, interference conditions that may restrict the simultaneous use of radio access techniques.

The subject matter described herein may thus provide mechanisms in the user equipment for communication with both the local area network and the wide area cellular system and provide encapsulation of messages (which request and/or provide information associated with support to the user equipment and the local area network) within the user-plane and/or control plane protocols used between the user equipment (or the local access point when configured with a link to the base station) and a base station, as well as other nodes of the wide area cellular network.

The wireless communication system 100 includes a plurality of base stations 110A-C, each supporting a corresponding coverage area (also referred to as a cell). The base stations 110A-C are capable of communicating with wireless devices within their coverage areas. For example, the first base station 110A is capable of communicating (e.g., transmitting and/or receiving) with user equipment 114A, and base station 110B is capable of communicating with user equipment 114B.

In some implementations, base station 110A may be implemented as an evolved Node B (eNB) type base station consistent with standards, including the Long Term Evolution (LTE) standards, such as 3GPP TS 36.201, "Evolved Universal Terrestrial Radio Access (E-UTRA); Long Term Evolution (LTE) physical layer; General description," 3GPP TS 36.211, "Evolved Universal Terrestrial Radio Access (E-UTRA); Physical channels and modulation," 3GPP TS 36.212, "Evolved Universal Terrestrial Radio Access (E-UTRA); Multiplexing and channel coding," 3GPP TS 36.213, "Evolved Universal Terrestrial Radio Access (E-UTRA); Physical layer procedures," 3GPP TS 36.214, "Evolved Universal Terrestrial Radio Access (E-UTRA); Physical layer—Measurements," and any subsequent additions or revisions to these and other 3GPP series of standards including 25 series of WCDMA/HSPA (collectively referred to as the LTE standards). The base stations 110A-C may also be implemented consistently with the Institute of Electrical and Electronic Engineers (IEEE) Standard for Local and metropolitan area networks, Part 16: Air Interface for Fixed Broadband Wireless Access Systems, 1 Oct. 2004, IEEE Standard for Local and metropolitan area networks, Part 16: Air Interface for Fixed and Mobile Broadband Wireless Access Systems, 26 Feb. 2006, IEEE 802.16m, Advanced Air Interface, and any subsequent additions or revisions to the IEEE 802.16 series of standards (collectively referred to as IEEE 802.16).

The user equipments 114A-C may be implemented as a mobile, portable, and/or a stationary device. The user equipments 114A-C are often referred to as, for example, mobile devices, mobile stations, mobile units, subscriber stations, wireless terminals, or the like. A user equipment may be implemented as, for example, a wireless handheld device, a wireless plug-in accessory, or the like. In some cases, user equipment may include a processor, a memory, RF-components, antenna, radio access mechanisms, a user interface, and the like. In some cases, the user equipment includes software program code stored in memory which when executed on a processor provides an operating system, middleware, applications, widgets and the like. For example, the user equipment may take the form of a wireless phone, a computer with a wireless connection to a network, a communicator, mini-laptop, palmtop, personal digital assistants (PDAs) or the like. Although for simplicity only three base stations, three user equipments, and one local access point are shown, other quantities of base stations, user equipments, and local access points may be implemented in wireless communication system 100 as well.

In some implementations, the links 150A-I each represent the radio protocols, frame structures, and physical signal compositions transmitted and received as a radio frequency (RF) signal. For example, links 150A-I may include data, such as voice, video, images, Internet Protocol (IP) packets, control information, and any other type of information. When IEEE-802.16 and/or LTE are used, the signal may use OFDMA multiplexing format. OFDMA is a multi-user version of orthogonal frequency division multiplexing (OFDM) transmission. In OFDMA, multiple access is achieved by assigning, to individual users, groups of subcarriers (also referred to as subchannels or resource blocks). The subcarriers (also referred to as tones) are modulated using BPSK (binary phase shift keying), QPSK (quadrature phase shift keying), or QAM (quadrature amplitude modulation), and they carry modulated symbols of bits including data coded using a forward error-correction code. The subject matter described herein is not limited to application to OFDMA systems, 3GPP, LTE, or to the noted standards and specifications.

As noted above, the local area network of system 100 may operate in an unlicensed, e.g., a license-exempt band, or in a licensed band. As a consequence, other devices may cause interference, so that the user equipment loses access to the local area network (e.g., the user equipment cannot access the local access point 130A for the local area network). This loss of access may be problematic, especially when the local access point 130A operates using dynamic frequency allocation or a flexible spectrum operation. When there is a loss, the local access point 130A may decide to operate at a different frequency, in which case the user equipment needs to determine the new operating frequency of the local access point 130A. Similarly, a user equipment that saves power by entering a sleep cycle may also loose the local area network connection and has to determine the new frequency being used by the local access point 130A. In these and other cases, the support node may be used to provide information to a user equipment to allow the user equipment to operate in the local area network.

The support node may provide to the user equipment local area network information, which is sent via the user plane, e.g., by sending an Internet Protocol (IP) packet via the user plane in, for example, a 3GPP configured wide area cellular network, or via the control plane between the user equipment and the base station. In the case of the user plane, the user equipment may send an IP packet to a support node via a base station (configured, e.g., as an evolved Node B base station), a tunnel, and a gateway having a packet data protocol (PDP) context for Internet. However, the establishment of a PDP context (and transport tunnels) causes a setup delay (of about 1 to 2 seconds) in order to send and receive packets. This delay is present only at the time of setup and does not cause delays like that in the connected state of operation. To avoid this long initial delay, the user equipment may stay in the active state even without having active packet flows and keep the PDP context active in the wide area cellular network.

To provide power efficient operation and avoid delays associated with establishing a PDP context, the user equipment and base station may instead exchange messages via the control plane, such as the control plane provided by 3GPP, as well as other standards. The control plane between the user equipment and the cellular network (e.g., a base station or other node in the wide area cellular network) may be used to transmit and receive local area network information to the support node. This information may include one or more of the following: the frequency band being used by the local access point 130A; the carrier frequencies in the band which are allowed to be used; the recommended carrier center frequency raster to search; the configuration of the local area network; the frame timing of the local area access point; the operational state (e.g., whether the local access point is in standby); the mobility or security context of the local area network; presence information; identification of available local area networks; and other like information associated with the local area network.

In any case, the user equipment may send to the support node a request for information or a request for action. For example, the request for action from the user equipment to the support node may be a power-up command (e.g., a power-up request) to the local area access point. The messages (which are also referred to herein as OLA control plane messages described further below) are exchanged between the user equipment and the support node via the control plane of the wide area cellular network.

In the case of Universal Mobile Telecommunications System Terrestrial Radio Access Network (UTRAN), the user equipment 114A may send to, and received from, the support node via the base station OLA control plane messages. The OLA control plane messages may include the local area network information, requests for that information (e.g., frequency band being used by the local access point, local area network configuration, etc.), and responses to requests.

As noted, the OLA control messages may be encapsulated within the control plane between the user equipment 114A and the base station 110A (implemented, e.g., as an eNB), although the user plane may be used as well.

Specifically, the user equipment 114A may send to a support node the OLA control plane messages to obtain assistance (e.g., request information about the local area network accessed via the local access point 130A) by encapsulating the OLA control plane messages in the control plane mechanisms of the wide area cellular network configured, for example, in accordance with UTRAN or EUTRAN, although other wireless standards may be used as well. The user equipment 114A is thus able to send, and/or receive, OLA control plane messages via the control plane to support operation in the wireless local area network which is wirelessly accessed via local access point 130A, resulting in low delays when compared to establishing a PDP context between the user equipment and the support node when the user plane is used. In some implementations, the subject matter described herein thus relates to encapsulation of OLA control plane messages. As used herein, encapsulate refers to including a first message within a second message, so that the second message essentially carries the first message. For example, the user element may send a request message to the support node by encapsulating the request message in a control plane message between the user element and the base station and another message handling node, such as a radio access node or a core network node.

Referring to system 100, the local area network is optimized (hence OLA) in the sense that the local area operation is supported by the support node (which may be located in, and/or accessed via, the wide area cellular network or the Internet). As such, the user equipment in the local area network may also operate with the wide area cellular network (which may even be configured as the default mode of system 100), operate in a stand-alone local area network, or a combination of both. In the stand-alone local area case, the user equipment may receive assistance from the support node within the local area network as well (in which case control plane encapsulation would not be used).

Figure 2:
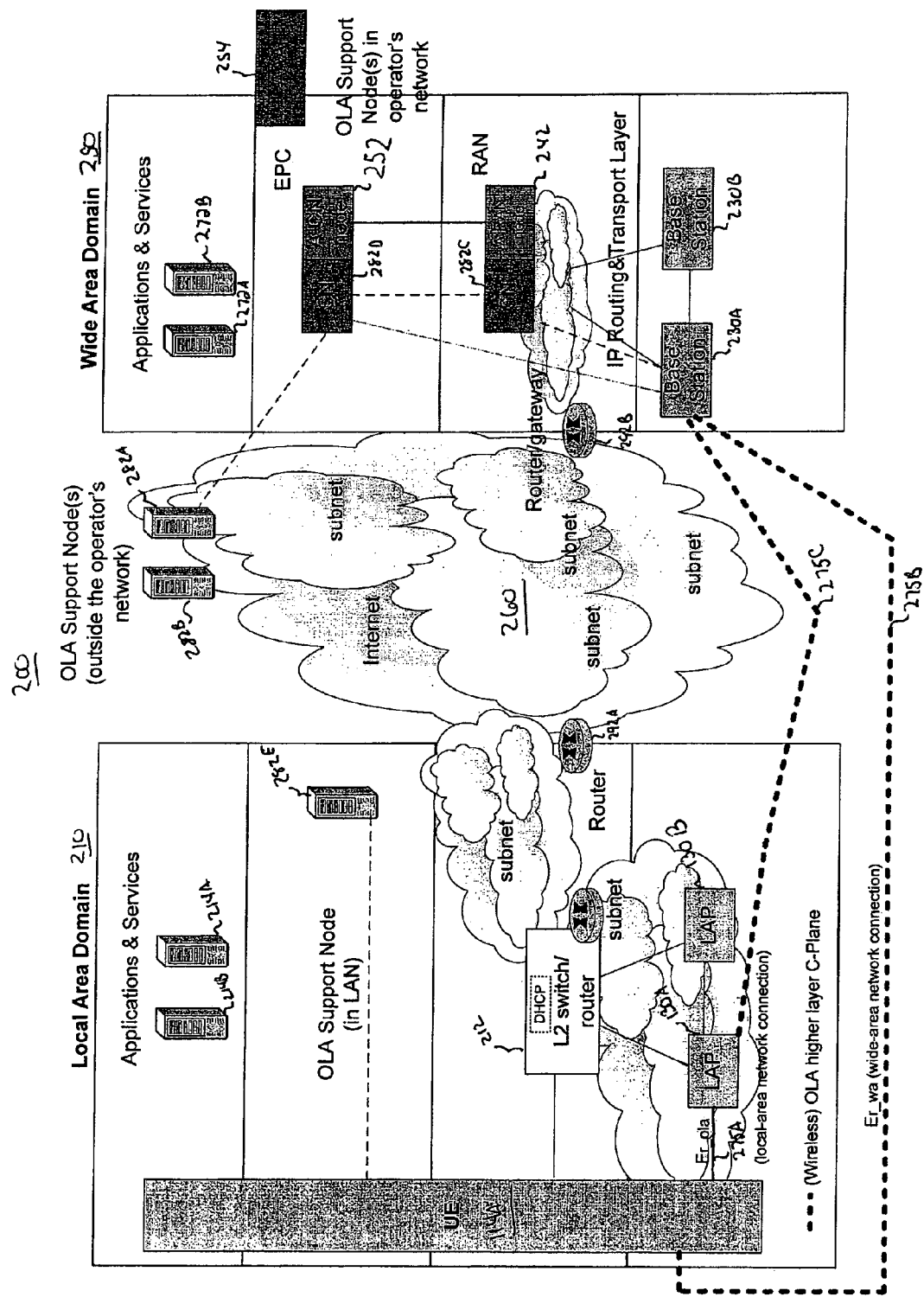
FIG. 2 depicts another example of a system 200 including wireless local area network access and wide area cellular network access.

FIG. 2 depicts a wireless local area domain 210 and a wide area domain 250, both of which may have IP connectivity via networks and sub-networks, as depicted by network 260. System 200 is similar to system 100 but includes additional implementation examples. The network 260 may provide IP connectivity accessed using wired links, wireless links, or a combination of both.

FIG. 2 includes user equipment 114A configured to wirelessly couple via link 275A to local access points 130A or B providing access to the local area network 210. The local access points 130A-B may be coupled to another node, such as a gateway router 212 (which may provide an IP address to the user equipment 114A using the dynamic host configuration protocol (DHCP)). The local area network 210 may include servers 214A-B configured to provide applications, control, and the like, and may include a support node 282E. Although FIG. 2 depicts a single user equipment 114A, other quantities of user equipment may included in local area domain 210 as well.

The user equipment 114A may also be configured to wirelessly couple via link 275B to base stations 230A or B providing access to the wide area cellular network 250. The base stations 230A-B may be implemented as a base station, such as an eNB type base station, a Node B type base station, or any other wide area cellular network access point. The base stations 230A-B may be further coupled to another node 242, which may be configured as a radio access network (RAN) node and may further include a support node 282C (labeled SN). The node 242 may be further coupled to other nodes, such as node 252 configured to include a core network node (labeled CN) and a support node 282D (labeled SN). Moreover, node 252 may be configured to control access to the wide area cellular network 250, and to access an authentication mechanism, such as Authentication, Authorization and Accounting (AAA) server 254 or cellular SIM authentication. The node 252 may also provide access to servers 272A-B configured to provide applications, control, etc. The node 252 may also couple to support nodes 282A-E. Moreover, IP network connectivity may be provided between the support nodes 282A-E and routers 292A-B.

FIG. 2 depicts the support nodes 282A-E at multiple locations (e.g., within the wide area domain 282C-D, the Internet 282B, an intranet 282A, the local domain 282E). However, the support nodes may be located in a single location and/or distributed among multiple locations. Although the support node may be implemented as a stand-alone node, the support node may be incorporated into another node and/or distributed among multiple nodes of system 200. For example, the support node may be integrated into one or more of the following: a mobility management entity (MME) server; an operations and maintenance server; a self-organizing networks (SON) server; a serving GPRS support node (SGSN); a gateway GPRS support node (GGSN); a serving packet date network (PDN) gateway; an Access Network Discovery and Selection Function (ANDSF) server; and the like. Moreover, the support node may be implemented as a server accessible via a network, such as the Internet or an intranet, or accessible via a script on a web page. The support node may be implemented in a local area subnet.

As noted, the support nodes 282A-E are configured to handle OLA control plane messages, send the OLA control messages to the user equipment 114A (or the local access point 130A-B), and receive OLA control messages from the user equipment 114A (or the local access point 130A-B). The OLA control plane messages, which may include information regarding the local area network, are encapsulated within the control plane messages between the user equipment 114A and a node of the wide area domain 250 (e.g., node 242 via the base station 230A).

Even though the OLA messages arrive at a wide area cellular network node, such as base station 230A (which may itself include the support node functionality), the support node functions may alternatively be located outside of the wide area cellular network, in which case the support node 282A-B, or E may be used. Moreover, the support node if located inside the wide area cellular network (e.g., support nodes 282C-D) may be configured to fetch some information from a support node outside of the wide area network service provider network. In some implementations, the OLA control plane messages may be sent to any node in the wide area cellular network, and those nodes may recognize the OLA control plane message by a network resource Identity (NRI) associated with that message.

When the support node is within the wide area domain 250, the OLA control plane messages may be tunneled from node 252 (which may be configured as an access control server) to one or more of the support nodes. Specifically, the OLA control plane messages may be sent by, for example, the user equipment 114A (or local access point 130A) to the support node 282A via wireless link 275C, which may be integrated into the functionality of an existing network node of wide area domain 250.

In cases where the support node is outside the service provider's cellular network (e.g., support nodes 282A, B and E), the OLA control plane messages may be tunneled from an existing cellular network node to that outside support node.

As noted, the local area network 210 may be configured to operate wirelessly in the licensed exempt band, which may cause uncertainties. Most notably, the user equipment 114A may lose its connection to the local area network 210, losing thus a connection 275A to one of the local access points 130A-B. When this loss occurs, the user equipment 114A may use a wide area connection 275B to obtain local area network information from a support node.

Moreover, at any given point in time, the local area network 210 may be configured to operate dynamically (e.g., at different frequency bands, such as 2.4 GHz, 5 GHz, or other so-called white spaces in the spectrum). The user equipment 114A may obtain from one of the support nodes, local area network information regarding the currently used frequency band and the parameters of the local area network 210. This local area network information may be carried as an OLA control plane message between the user equipment 114A and the base station 230, e.g., an eNB base station, and then on to a support node, such as support node 282C.

In some implementations, the support nodes 282A-E may include, or have access to, a database including frequency bands and white space portions of the spectrum, which may be used by the local area network 210.

In some implementations, the local area network 210 may be configured to support a power saving operations, such that the local access points 130A-B, and/or the user equipment 114A can go into a sleep, or stand by, mode. When in sleep or stand by mode, the base station 230A (e.g., eNB) may page the user equipment 114A via link 275B to wake up the user equipment 114A. Likewise, the base station 230A (e.g., eNB) may page one of the local access points 130 of the local area network 210 to wake up.

In some instances, the user equipment 114A may be in an active state (i.e., connected and/or transmitted) in both the local area network 210 and the wide area cellular network 250. Being active in both networks (e.g., continuously active, such as 24 hours per day) may reduce the available time (also referred to as stand by) that the user equipment 114A may operate without requiring a power recharge. In any case, it is more energy efficient to receive emails through the local area network 210 when compared to receiving emails through the wide area cellular network 250. As such, the user equipment 114A may be configured to stay active in the local area network 210 but stay in an idle mode in the wide area cellular network 250 to enable reception of voice calls. But when the user equipment 114A is in an idle state, it takes time (e.g., at least about 1 to 2 seconds) to establish a PDP context as noted above. To avoid having to establish the PDP context as noted above, the system 200 may encapsulate, as noted above, a message (which is associated with the local area network) using the control plane to the wide area cellular network configured in accordance with 3GPP, although other cellular standards may be used as well.

The user equipment, such as user equipment 114A, may be configured to encapsulate OLA control plane messages into NAS signaling layer messages. An example of the NAS signaling layer is described in 3GPP TS 24.008, titled "Mobile radio interface Layer 3 specification; Core network protocols; Stage 3."

Moreover, the OLA control plane messages may be sent to a node within the wide area cellular network, and the node may be addressed (e.g., with an address specified by the Network Resource Identifier (NRI) known by the network serving the user equipment). This addressed node may be the support node 282C-D (e.g., when the node is within the service provider's network) or the node may be the serving GPRS support node (SGSN) enhanced with the functionality of routing any arriving OLA control plane messages through a tunnel, such as an IP Security (IPSec) tunnel, to a support node.

After sending the OLA control plane message to a support node via the control plane of the base station, the user equipment 114A may enter an active mode state and wait for a response from, e.g., the support node. After receiving the response, the user equipment may, in some implementations, send to the eNB base station (e.g., base station 230) a message to signal the end of the OLA service, in which case the user equipment 114A may return to a power save mode.

In other instances, a node (e.g., base station 230A configured as an eNB) in the wide area cellular network 250 may initiate sending an OLA control message to user equipment 114A. When that is the case, paging is used to notify the user equipment 114A about a network initiated OLA control plane message. The user equipment 114A responds to the wide area cellular network 250 with a paging response service request and then receives from the network 250 an OLA control plane message. If the received OLA control plane message requires the user equipment 114A to respond, the user equipment 114A may respond as described above with respect to the user equipment initiated instance.

To further illustrate, the OLA control plane messages configured as NAS messages may be routed in a node of the wide area cellular network 250. The routing may be based on message type fields or a protocol discriminator, which may be in accordance with a standard, such as 3GPP TS 24.007, titled "Mobile radio interface signaling layer 3; General Aspects." Moreover, the OLA control plane message may be included within one of the existing NAS message types, such as General Transparent Transport Protocol (GTTP) message, non-call related supplementary service messages, location service messages, and the like. The OLA control plane messages may also be implemented as its own type of NAS message using a reserved extension of the NAS message protocol discriminators. In any case, the NAS message protocol encapsulates the OLA control message.

In the case of the ANDSF server, the ANDSF server is accessed via the user plane rather than the control plane. The ANDSF server is specified in, for example, 3GPP to assist/control the mobility of a user equipment between 3GPP access and non-3GPP accesses, such as a wireless local area network (e.g., network 210). The ANDSF server provides the user equipment 114A with policies for preferred networks and informs the user equipment 114A of any available networks. The user equipment 114A accesses both the ANDSF server of the home operator (i.e., service provider of wide area cellular network 250) and, when roaming, the ANDSF server of another operator. The interface between the user equipment 114A and the ANDSF server may be realized over the user plane using open mobile alliance-device management (OMA-DM). The address of the ANDSF server may be pre-provisioned in the user equipment, provisioned as a domain name server look-up, provisioned as a DHCP query option, or provisioned as part of the OMA-DM bootstrap mechanism.

FIGS. 3A-E illustrate examples of encapsulating OLA control plane messages 362A-B using the control plane among the user equipment, the base station, and/or the support node. There are two mechanisms for communicating OLA control plane messages. One is the use of NAS signaling in the 3GPP OLA control plane, and the other mechanism includes user-plane IP packets. In any case, the delivery of the OLA control plane messages may be in a circuit-switched mode of 3GPP or a packet-switched mode of 3GPP.

Specifically, FIGS. 3A-E depict a user equipment 310A and a support node 320A. Although the user equipment 310A is described below, in some implementations, an access point (e.g., local access point 130A) may be used as well to send to, and/or receive from, the support node the OLA control plane messages. In any case, the user equipment 310A may send a message via a message interface 305 (e.g., an application programming interface) to the OLA protocol engine 307 (e.g., included within the user equipment and/or in the local access point). The OLA protocol engine 307 composes and formats the OLA control plane message (e.g., as described with respect to FIG. 4). The encapsulated OLA control plane message 362A is then sent to a base station (labeled BSS) or another cellular network node. The base station (or cellular network node) forwards the OLA control plane message to the support node, where the OLA protocol engine 397 is available via a message interface 390. The OLA protocol engine 397 processes the message contents and provides a response, such as information and/or a command, as noted above.

Figure 3A:
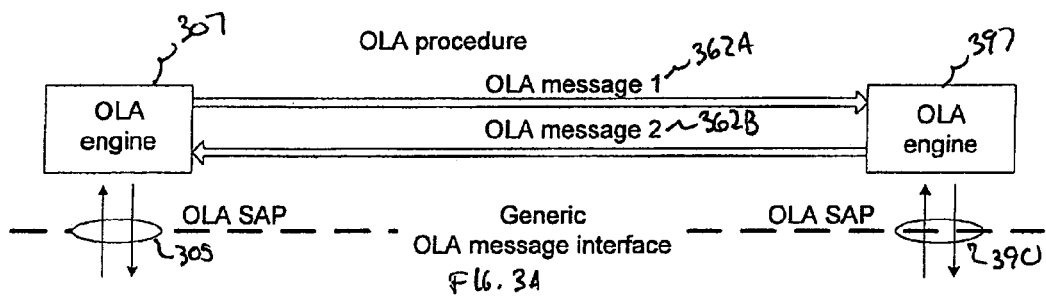
FIGS. 3A-E depicts examples of encapsulation of optimized local area (OLA) control plane messages.
Figure 3B:
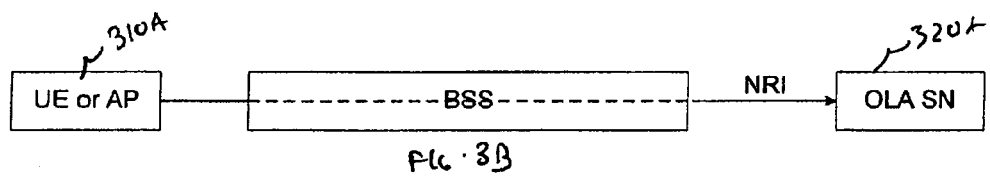

Moreover, in the case of FIG. 3B, the NRI is used to identify the network node in the wide area cellular network which includes the support node, although the NRI may identify another node that forwards the OLA control plane message to the support node, e.g., support node 320A, where the OLA engine 397 and OLA SAP (service access point) interface 390 are located. The OLA SAP interface may be a task or a software process running in a server, which is activated once the encapsulation type indicates an OLA protocol message and the encapsulation headers are removed.

Figure 3C:
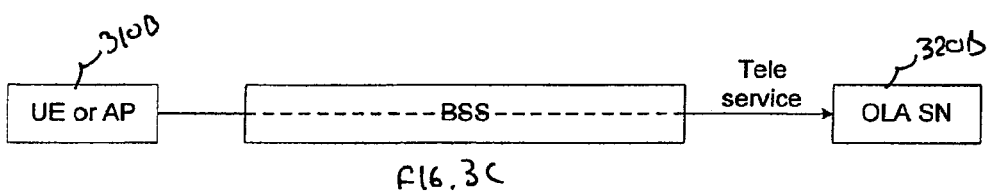

FIG. 3C depicts OLA control plane messages encapsulated using a teleservice addressing a node of the wide area cellular network. In the context of 3GPP, the term teleservice refers circuit-switched services that provide end-to-end communications capabilities between terminal equipment and a server. For example, the OLA control plane message 362A may be sent from the user equipment 310B (or local access point 130A) to the support node 320B by using the tele-address (e.g., a phone number, a fax number, or a modem address) of the support node 320B. Similarly, the OLA control plane message 362B may be sent from the support node 320B to the user equipment 310B using the tele-address of the user equipment 310B.

Figure 3D:
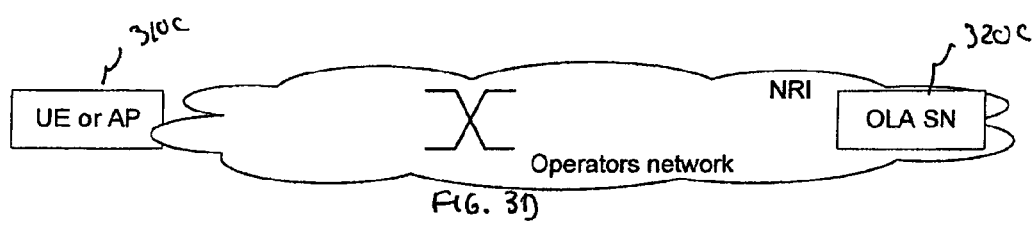

FIG. 3D depicts the OLA control plane messages 362A-B encapsulated based on a packet-switched NAS signaling. For example, the user equipment 310C address the OLA control plane message 362A using the NRI of the support node 320C. Packet-switched NAS signaling messages correspond to the circuit-switched NAS signaling messages, but OLA control plane message 362A may be routed in the packet-switched RAN and core network packet-switched transport as well.

Figure 3E:
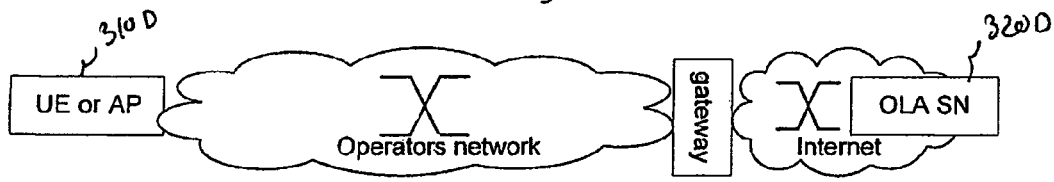

FIG. 3E depicts OLA control plane messages 362A-B encapsulated within IP packets as application level messages between the user equipment 310D and the support node 320D. In the packet-switched user plane mode, OLA messages reach the packet data gateway on the transport bearers. The gateway delivers the OLA control plane messages to the Internet (e.g., Internet 260) as Internet packets including the destination address of the support node. The IP addresses of the source and destination nodes (e.g., user equipment 310D and the support node 320D) may be predetermined, so that a session initiation and search of the support node (e.g. through DNS procedure) can be avoided. If the IP address of the support node is not readily preconfigured (or otherwise known) to the user equipment, the user equipment may determine (e.g., fetch) the IP address from the mobility context present in a cellular network node.

In a wide area cellular network configured in accordance with 3GPP, the radio network controller (RNC), SGSN, GGSN, mobile services switching center (MSC), and the like may be addressed and accessed via NAS, and the support nodes can be implemented in one or more of the RNC, SGSN, GGSN, MSC, and the like. In the case of the circuit-switched mode signaling, the OLA control plane messages may reach a known NRI (e.g. a default network node for NAS signaling) in the wide area cellular network, where the OLA control plane messages can be handled. In circuit-switched mode using the user plane, a teleservice (a teleservice bearer) between known entities is setup and the OLA control plane messages are delivered point-to-point between the user equipment and the serving node running the teleservice. In packet-switched mode, OLA control plane message delivery is relatively more flexible due to flexible connectivity over the interface between the radio access network and a core network node (e.g., the Iu-interface). In this mode, the OLA engine is run in one or more of the selected nodes of the wide area cellular network to handle the OLA control plane messages. However, the selected nodes typically recognize the encapsulation type for OLA control plane messages, and process the OLA control plane messages. In the packet-switched mode using 3GPP-based signaling, any 3GPP node (in the RAN or in the Evolved Packet Core network) may be addressed to receive the OLA control plane messages.

Figure 4:
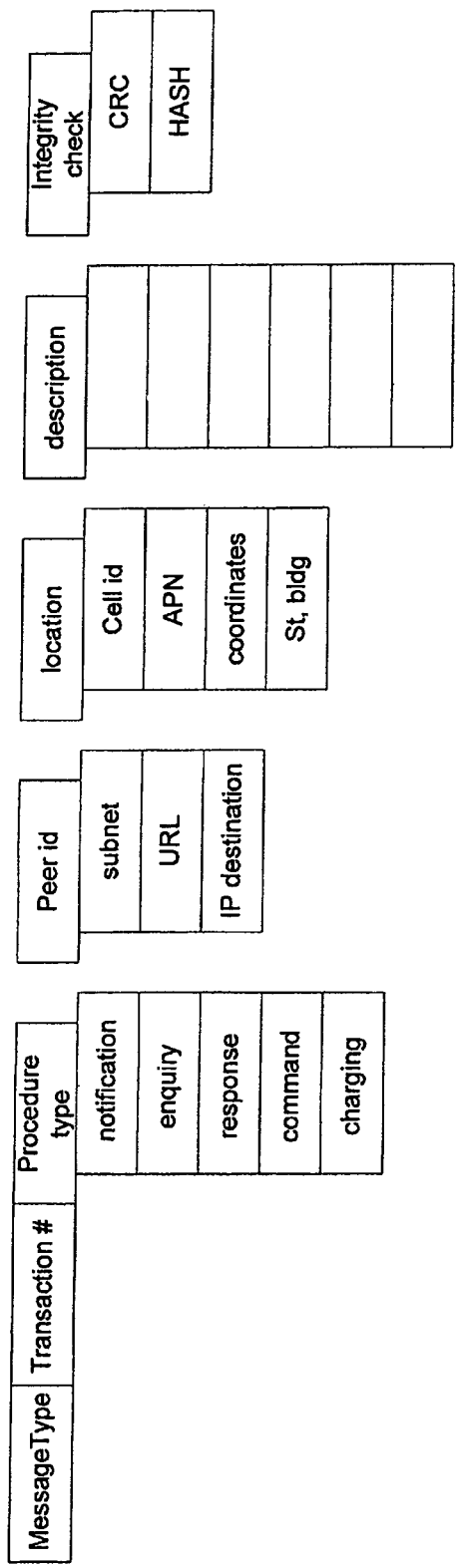
FIG. 4 depicts a format 400 for an OLA control plane message.

FIG. 4 depicts an example of a format of an OLA control plane message, which includes information elements (e.g., defined protocol fields) to enable efficient handling of the OLA control plane message. The OLA control plane message may be formatted as a standardized message type for the OLA protocol engine, and the OLA control plane message may be encapsulated in a message format that is recognizable by nodes of the networks, such as 100 and 200.

Specifically, in the example of FIG. 4, the OLA control plane message includes a message type, a transaction number, a procedure type, a peer identifier, a location, a description, and an integrity check. For example, the OLA engines 307 and 397 configure messages for transmission according to a format, such as the one depicted at FIG. 4.

Moreover, the OLA engine may fetch information for a requested OLA procedure (e.g., notification, inquiry, response, command, charging, etc.), and create a response. The OLA control plane message may be of one or more of the following types: notifications that do not require a response; notifications that expect to receive an acknowledgement; configurations that expect an acceptance and validation; security controls (authentication or certification); presence inquiry and presence response; presence of peers in the same local area domain; presence of a local area domain in a given physical position (e.g., cell identifier, geographic/GPS coordinates, or street and/or building address); and charging (e.g. initial charging of an OLA assistance service from the operators network). For example, the user equipment 114A may send to support node 282A an OLA control message having a type of notification that expects to receive an acknowledgement.

The OLA control plane messages may enter an encapsulation process, which includes assigning a procedure identifier, a transaction identifier, and/or the message type. The information elements of OLA control plane message may define the requested OLA operation based on the types depicted at FIG. 4. For example, the support node 282 may respond to the notification type with another notification type providing the frequency band being used by the local access point 130A.

Figure 5:
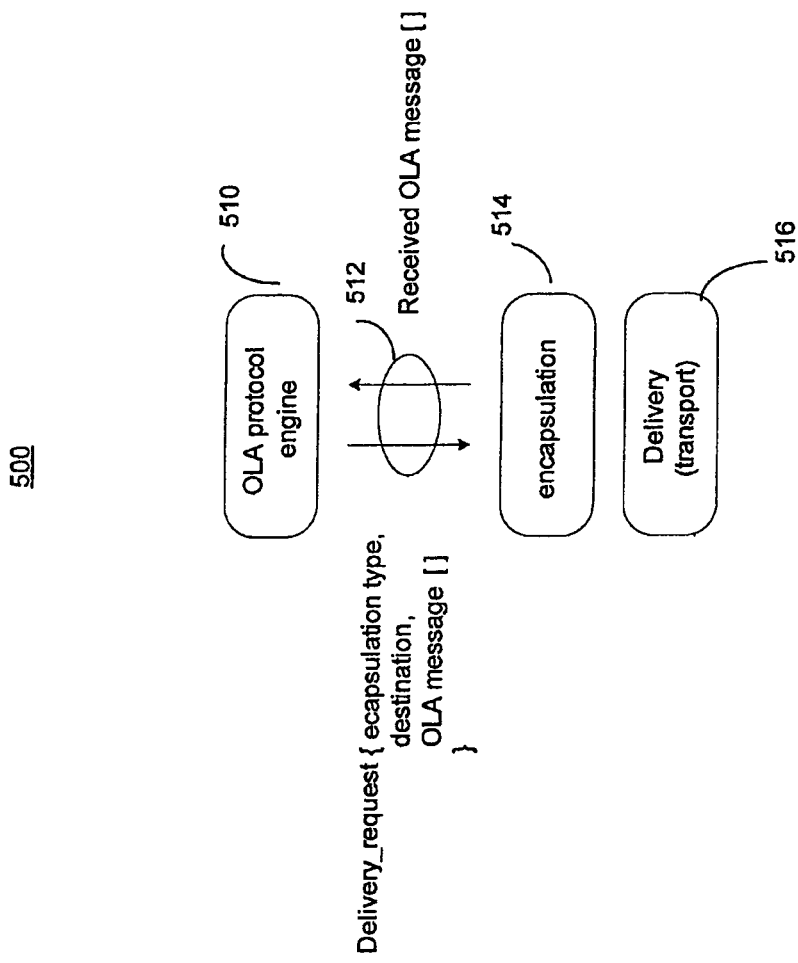
FIG. 5 depicts a process 500 for using a control plane protocol engine.

FIG. 5 depicts an example of the encapsulation process 500 that may be present as software in the user equipment, the local access point, the support node, and/or any other node of systems 100 and 200. In some implementations, the process 500 uses transport mechanisms 516 provided via 3GPP, although other mechanisms may be used as well. For example, the 3GPP transport mechanisms include control plane messages transmitted in accordance with NAS.

Referring to FIG. 5, the user equipment, such as user equipment 114A, may send an OLA control plane message to a support node, such as support node 282A, by first accessing an interface 512 of an OLA protocol engine 510. The OLA control plane message may specify the type of encapsulation, the destination (e.g., address of the support node), and the OLA message contents (e.g., a request for information regarding the local area network). At 514, the type of encapsulation is implemented, as described above with respect to FIGS. 3A-E. At 516, the encapsulated OLA control plane message is then delivered via the base station and wide area cellular network (e.g., base station 230A and network 250) to a support node. The type of encapsulation may depend on the type of wide area cellular technology used for message deliver, e.g., the format of the encapsulation will vary based on whether GSM/EDGE, UMTS WCDMA/HSPA, LTE, EUTRA network technology is being used.

At the support node, the received encapsulated OLA control plane message is first decapsulated, and the OLA control plane message is delivered to the OLA SAP interface 512 in order to be processed by the OLA protocol engine 510, which processes the OLA control message contents. For example, the OLA protocol engine 510 may receive a notification requesting information indicating the frequency band being used by the local access point 130A of the local area network 210, and then generate a response, which includes the requested information. The response may be configured as an OLA control plane message (which is encapsulated as noted above with respect to 514) and transported (e.g., sent) to the user equipment (or local access point) via the base station and wide area cellular network (e.g., base station 230A and network 250).

The subject matter described herein may be embodied in systems, apparatus, methods, and/or articles depending on the desired configuration. For example, the base stations, support nodes, user equipments (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, firmware or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A method comprising:
generating, at a protocol engine at a user equipment configured to operate in a wireless local area network and a cellular network, a message including a request for information representative of a configuration of the wireless local area network, wherein the request is used to at least wake-up a wireless local area network access point serving the wireless local area network in order to facilitate discovery; and
transmitting, via encapsulation, the message to a base station to enable the base station to forward the request via encapsulation to another protocol engine at a support node configured to provide, responsive to the request, the information representative of the configuration of the wireless local area network to at least one of the user equipment and the base station,
wherein the information representative of the configuration of the wireless local area network enables the user equipment to operate in the wireless local area network, and
wherein the base station is configured to operate in the cellular network.

2. The method of claim 1, wherein the encapsulation comprises control plane signaling carrying the message.

3. The method of claim 2, wherein the control plane signaling comprises at least one of a cellular control plane signaling message or a network access stratum signaling layer message.

4. The method of claim 1, wherein the encapsulation comprises at least one of a user plane or a control plane signaling carrying the message.

5. The method of claim 1 further comprising:
receiving in response to the transmitted message, the information representative of the configuration of the wireless local area network, wherein the received information further comprises at least one of: a frequency band being used by the wireless local area network access point, a carrier frequency, a configuration of the wireless local area network access point, a frame timing of the wireless local area network access point, an operational state of the wireless local area network access point local access point, or security information of the wireless local area network access point.

6. A method comprising:
receiving, at a base station configured to operate in a cellular network, a message including a request, from a user equipment configured to operate in the wireless local area network and the cellular network, for information representative of a configuration of a wireless local area network accessible by the user equipment including a protocol engine, wherein the request is received via encapsulation and used to at least wake-up a wireless local area network access point serving the wireless local area network in order to facilitate discovery; and
forwarding, by the base station, the request via encapsulation to another protocol engine at a support node configured to provide, responsive to the request, the information representative of the configuration to at least one of the user equipment and the base station, wherein the information representative of the configuration enables the user equipment to operate in the wireless local area network.

7. The method of claim 6, wherein the encapsulation comprises control plane signaling carrying the message.

8. The method of claim 7, wherein the control plane signaling comprises at least one of a cellular control plane signaling message or a network access stratum signaling layer message.

9. The method of claim 6, wherein the information representative of the configuration of the wireless local area network comprises at least one of: a frequency band being used by the wireless local area network access point, a carrier frequency, a configuration of the wireless local area network access point, a frame timing of the wireless local area network access point; an operational state of the wireless local area network access point, or security information of the wireless local area network access point.

10. An apparatus comprising:
at least one processor; and
at least one memory including computer program code, the at least one memory and the computer program code configured to, working with the at least one processor, cause the apparatus to at least perform the following:
generate, at a protocol engine at a user equipment configured to operate in a wireless local area network and a cellular network, a message including a request for information representative of a configuration of the wireless local area network, wherein the request is used to at least wake-up a wireless local area network access point serving the wireless local area network in order to facilitate discovery; and
transmit, via encapsulation, the message to base station to enable the base station to forward the request via encapsulation to another protocol engine at a support node configured to provide, responsive to the request, the information representative of the configuration to at least one of the user equipment and the base station, the information representative of the configuration enables the user equipment to operate in the wireless local area network,
wherein the apparatus comprises the user equipment, and wherein the base station is configured to operate in the cellular network.

11. The apparatus of claim 10, wherein the encapsulation comprises control plane signaling carrying the message.

12. The apparatus of claim 11, wherein the control plane signaling comprises at least one of a cellular control plane signaling message or a network access stratum signaling layer message.

13. The apparatus of claim 10, wherein the information representative of the configuration of the wireless local area network comprises at least one of: a frequency band being used by the wireless local area network access point, a carrier frequency, a configuration of the wireless local area network access point, a frame timing of the wireless local area network access point, an operational state of the wireless local area network access point, or security information of the wireless local area network access point.

14. An apparatus comprising:
at least one processor; and
at least one memory including computer program code, the at least one memory and the computer program code configured to, working with the at least one processor, cause the apparatus to at least perform the following:
receive, at a base station configured to operate in a cellular network, a message including a request, from a user equipment configured to operate in a wireless local area network and the cellular network, for information representative of a configuration of the wireless local area network accessible by the user equipment including a protocol engine, wherein the request is received via encapsulation and used to at least wake-up a wireless local area network access point serving the wireless local area network in order to facilitate discovery; and forward, by the base station, the request via encapsulation to another protocol engine at a support node configured to provide, responsive to the request, the information representative of the configuration to at least one of the user equipment and the base station, wherein the information representative of the configuration enables the user equipment to operate in the wireless local area network, wherein the apparatus comprises the base station.

15. The apparatus of claim 14, wherein the encapsulation comprises control plane signaling carrying the message.

16. The apparatus of claim 15, wherein the control plane signaling comprises at least one of a cellular control plane signaling message or a network access stratum signaling layer message.

17. The apparatus of claim 14, wherein the information representative of the configuration of the wireless local area network comprises at least one of: a frequency band being used by the wireless local area network access point, a carrier frequency, a configuration of the wireless local area network access point, a frame timing of the wireless local area network access point, an operational state of the wireless local area network access point, or security information of the wireless local area network access point.

18. A non-transitory computer-readable storage medium including computer program code which when executed by at least one processor causes operations comprising:

generating, at a protocol engine at a user equipment configured to operate in a wireless local area network and a cellular network, a message including a request for information representative of a configuration of the wireless local area network, wherein the request is used to at least wake-up a wireless local area network access point serving the wireless local area network in order to facilitate discovery; and transmitting, via encapsulation, the message to a base station to enable the base station to forward the request via encapsulation to another protocol engine at a support node configured to provide, responsive to the request, the information representative of the configuration of the wireless local area network to at least one of the user equipment and the base station, wherein the information representative of the configuration of the wireless local area network enables the user equipment to operate in the wireless local area network, and wherein the base station is configured to operate in the cellular network.

19. The non-transitory computer-readable storage medium of claim 18, further comprising:

receiving, in response to the transmitted message, at least one of: a frequency band being used by the wireless local area network access point, a carrier frequency, a configuration of the wireless local area network access point, a frame timing of the wireless local area network access point, an operational state of the wireless local area network access point, or security information of the wireless local area network access point.

20. The method of claim 1, wherein the request comprises presence information of an available wireless local area network detected by the user equipment.

21. The method in claim 4, wherein the carrying message is representative of an access network discovery and selection function.

\* \* \* \* \*